(12) United States Patent
Kozasa (10) Patent No.: US 10,464,398 B2
(45) Date of Patent: Nov. 5, 2019

(54) VEHICLE ANTI-FOGGING DEVICE

(71) Applicant: DENSO CORPORATION, Kariya, Aichi-pref. (JP)

(72) Inventor: Tetsuo Kozasa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 196 days.

(21) Appl. No.: 15/567,168

(22) PCT Filed: Mar. 8, 2016

(86) PCT No.: PCT/JP2016/057228
§ 371 (c)(1),
(2) Date: Oct. 17, 2017

(87) PCT Pub. No.: WO2016/170861
PCT Pub. Date: Oct. 27, 2016

(65) Prior Publication Data
US 2018/0134124 A1 May 17, 2018

(30) Foreign Application Priority Data

Apr. 24, 2015 (JP) .................................. 2015-089526

(51) Int. Cl.
*F28D 15/00* (2006.01)
*B60H 3/02* (2006.01)
(Continued)

(52) U.S. Cl.
CPC ......... *B60H 3/024* (2013.01); *B60H 1/00785* (2013.01); *B60H 1/3202* (2013.01);
(Continued)

(58) Field of Classification Search
CPC .. B60H 3/024; B60H 1/00785; B60H 1/3202; B60H 3/00; F25B 23/006; F28D 15/0266; F28F 1/32
(Continued)

(56) References Cited

U.S. PATENT DOCUMENTS 5,311,927 A * 5/1994 Taylor .................. B60H 1/3202
165/64
5,579,994 A * 12/1996 Davis, Jr. ........... B60H 1/00735
236/49.3
(Continued)

FOREIGN PATENT DOCUMENTS

JP S61128096 A 6/1986
JP H06080016 A 3/1994
(Continued)

*Primary Examiner* — Claire E Rojohn, III
(74) *Attorney, Agent, or Firm* — Harness, Dickey & Pierce, P.L.C.

(57) ABSTRACT

A vehicle anti-fogging device is applied to a vehicle provided with an air conditioning apparatus for controlling a temperature of air blown into a vehicle interior, and includes a thermosiphon. The thermosiphon is formed separately from the air conditioning apparatus and exchanges heat with vehicle interior air to condense the vehicle interior air. The thermosiphon includes a first heat exchanger configured to radiate heat from the refrigerant to the vehicle exterior air, a second heat exchanger configured to absorb heat from the vehicle interior air into the refrigerant, and a refrigerant pipe that connects the first heat exchanger to the second heat exchanger to form a closed loop refrigerant circuit through which the refrigerant circulates.

9 Claims, 8 Drawing Sheets

(51) Int. Cl.
  *B60H 3/00* (2006.01)
  *B60H 1/00* (2006.01)
  *B60H 1/32* (2006.01)
  *F25B 23/00* (2006.01)
  *F28D 15/02* (2006.01)
  *F28F 1/32* (2006.01)

(52) U.S. Cl.
  CPC ............ *B60H 3/00* (2013.01); *F25B 23/006* (2013.01); *F28D 15/0266* (2013.01); *F28F 1/32* (2013.01)

(58) Field of Classification Search
  USPC .................................................. 165/104.25
  See application file for complete search history.

(56) References Cited

U.S. PATENT DOCUMENTS

| | | | | |
|---|---|---|---|---|
| 6,077,158 | A * | 6/2000 | Lake ................... | B60H 1/00278 454/70 |
| 6,118,099 | A * | 9/2000 | Lake ................... | B60H 1/00907 165/43 |
| 6,155,061 | A * | 12/2000 | Davis, Jr. ........... | B60H 1/00785 165/204 |
| 6,205,805 | B1 * | 3/2001 | Takahashi ............ | B60H 3/024 62/271 |
| 6,213,198 | B1 * | 4/2001 | Shikata .............. | B60H 1/00478 165/202 |
| 6,321,552 | B1 * | 11/2001 | Frederiksen ......... | B60H 1/32 123/41.23 |
| 9,643,474 | B2 * | 5/2017 | Park ................... | B60H 3/024 |
| 9,758,054 | B2 * | 9/2017 | Schilder ............. | B60L 58/26 |
| 9,925,844 | B2 * | 3/2018 | Kehimkar ........... | B60H 1/00021 |
| 10,059,306 | B2 * | 8/2018 | Gong ................. | B60S 1/54 |
| 10,099,535 | B2 * | 10/2018 | Sekito ............... | B60H 1/00064 |
| 10,118,461 | B2 * | 11/2018 | Sutherland ......... | B60H 1/00392 |
| 2001/0005991 | A1 * | 7/2001 | Niimi ................. | B60H 1/3208 62/133 |
| 2006/0113071 | A1 * | 6/2006 | Weible ............... | B60H 1/00342 165/202 |
| 2007/0025105 | A1 | 2/2007 | Inoue et al. | |
| 2007/0184320 | A1 * | 8/2007 | Domen ............... | F01P 3/20 429/435 |
| 2007/0221360 | A1 * | 9/2007 | Hayashi ............. | B60H 1/00271 165/42 |
| 2008/0066477 | A1 * | 3/2008 | Aoki ................. | B60H 1/00785 62/150 |
| 2009/0038774 | A1 * | 2/2009 | Ogiso ................. | B60H 1/245 165/42 |
| 2010/0001086 | A1 * | 1/2010 | Bhatti ................. | B60H 1/025 237/6 |
| 2010/0296308 | A1 | 11/2010 | Ohsawa | |
| 2011/0016896 | A1 * | 1/2011 | Oomura ............. | B60H 1/00785 62/155 |
| 2011/0029152 | A1 * | 2/2011 | Patel ................... | H05K 7/20836 700/300 |
| 2011/0048676 | A1 * | 3/2011 | Toyoda ............... | F28D 1/05366 165/104.21 |
| 2011/0113800 | A1 * | 5/2011 | Sekiya ............... | B60H 1/00278 62/151 |
| 2011/0277967 | A1 * | 11/2011 | Fried ................... | F28D 15/0266 165/104.26 |
| 2012/0241127 | A1 * | 9/2012 | Watanabe ............ | B01D 53/261 165/42 |
| 2013/0055746 | A1 * | 3/2013 | Yokoo ................. | F25B 41/04 62/238.1 |
| 2013/0104592 | A1 * | 5/2013 | Cottet ................. | H05K 7/20672 62/419 |
| 2013/0107455 | A1 * | 5/2013 | Cottet ................. | H05K 7/20672 361/694 |
| 2013/0112390 | A1 * | 5/2013 | Arai .................... | B60H 1/00771 165/202 |
| 2014/0087644 | A1 * | 3/2014 | Watanabe ........... | B60H 1/00785 454/75 |
| 2014/0338883 | A1 * | 11/2014 | Watanabe ............ | B60H 3/024 165/287 |
| 2015/0369541 | A1 * | 12/2015 | Dupont ............... | F28D 15/025 165/104.26 |
| 2017/0074598 | A1 * | 3/2017 | Winkler ............... | F28D 15/06 |
| 2018/0022188 | A1 * | 1/2018 | Kakizaki ............. | B60H 1/3202 |
| 2018/0194197 | A1 * | 7/2018 | Kozasa ................ | B60H 1/22 |
| 2019/0030997 | A1 * | 1/2019 | Maeda ................. | G01N 27/121 |
| 2019/0190102 | A1 * | 6/2019 | Miura ................. | H01M 10/6569 |

FOREIGN PATENT DOCUMENTS

| | | |
|---|---|---|
| JP | H06092132 A | 4/1994 |
| JP | H09254630 A | 9/1997 |
| JP | H10006746 A | 1/1998 |
| JP | H10016531 A | 1/1998 |
| JP | H10300128 A | 11/1998 |
| JP | 2000108655 A | 4/2000 |
| JP | 2002040217 A | 2/2002 |
| JP | 2004216932 A | 8/2004 |
| JP | 2004314878 A | 11/2004 |
| JP | 2006274094 A | 10/2006 |
| JP | 2007035513 A | 2/2007 |
| JP | 2007069695 A | 3/2007 |
| JP | 2007261328 A | 10/2007 |
| JP | 2007299676 A | 11/2007 |
| JP | 2008047384 A | 2/2008 |
| JP | 2010070767 A | 4/2010 |
| JP | 2013014307 A | 1/2013 |
| JP | 2013159284 A | 8/2013 |
| JP | 2013250035 A | 12/2013 |
| JP | 2014008808 A | 1/2014 |
| JP | 2014047979 A | 3/2014 |
| WO | WO-2009090700 A1 | 7/2009 |

\* cited by examiner

VEHICLE ANTI-FOGGING DEVICE

CROSS-REFERENCE TO RELATED APPLICATIONS

This application is a U.S. National Phase Application under 35 U.S.C. 371 of International Application No. PCT/JP2016/057228 filed on Mar. 8, 2016 and published in Japanese as WO 2016/170861 A1 on Oct. 27, 2016. This present application is based on and claims the benefit of priority from Japanese Patent Application No. 2015-089526 filed on Apr. 24, 2015. The entire disclosures of all of the above applications are incorporated herein by reference.

TECHNICAL FIELD

The present disclosure relates to a vehicle anti-fogging device that prevents a window glass of a vehicle from being fogged.

BACKGROUND ART

In recent years, in an inside air mode in which an air in a vehicle interior air (hereinafter referred to as inside air) is circulated in winter, a need to ensure an anti-fogging property is increasing.

However, in a vapor compression type refrigeration cycle generally used in a vehicle air conditioning apparatus, when an outside air temperature is low like in winter, particularly when traveling at a high speed, a refrigerant cooling capacity of a condenser (that is, a capacity to condense and liquefy a refrigerant) becomes too high and a refrigerant pressure on a high-pressure side becomes too low. In the refrigeration cycle, when the refrigerant pressure on the high-pressure side becomes too low, a differential pressure between the high-pressure side and the low-pressure side decreases, a refrigerant discharge amount of a compressor decreases, and a refrigerant circulation amount of the refrigeration cycle severely decreases.

When the inside air mode is selected in such a state, the inside air high in temperature (for example, 25° C.) suctioned into an evaporator leads to a high heat load, the refrigerant pressure on a low-pressure side rises, and the differential pressure between the high-pressure side and the low-pressure side further decreases. As a result, the amount of liquid refrigerant stagnant in the condenser increases, a flow rate of the refrigerant fed to the evaporator decreases, the evaporator falls into a gas deficient state, a refrigerant distribution is deteriorated, and a dehumidification capacity decreases due to an increase in the superheat amount. Therefore, an absolute humidity of the air conditioning wind used for defogging rises, and the window glass becomes foggy.

Further, when the outside air temperature further drops, the differential pressure between the high-pressure side and the low-pressure side is eliminated, the refrigeration cycle collapses, the evaporator dehumidification capacity is lost, and the window glass may suddenly become fogged during traveling.

For example, Patent Literature 1 has proposed a refrigeration cycle device that is capable of being switched between a refrigeration cycle mode and a thermosiphon mode.

The refrigeration cycle device disclosed in Patent Literature 1 includes, as basic components, a compressor that compresses a refrigerant, a condenser that cools and condenses the refrigerant with a vehicle exterior air (hereinafter referred to as outside air), an evaporator that performs a heat exchange between the refrigerant and the inside air to cool the inside air, and an electric expansion valve for reducing a pressure of the refrigerant.

Further, the refrigeration cycle device disclosed in Patent Literature 1 further includes a bypass passage that bypasses the compressor, and a check valve that opens the bypass passage when the compressor stops. When the thermosiphon mode operation is performed, the compressor is stopped to open the check valve, an electric expansion valve is opened, and the refrigerant is circulated between the condenser and the evaporator to perform heat transfer.

In the refrigeration cycle mode, when the outside air temperature is low as in winter, the condenser refrigerant cooling capacity becomes too high, the refrigerant circulation amount decreases, and the dehumidification capacity decreases. However, in the thermosiphon mode, even when the outside air temperature is low like in winter, the refrigerant can be circulated between the condenser and the evaporator to perform heat transfer, the inside air is cooled down to a dew point temperature or lower, and moisture in air can be condensed and dehumidified. This makes it possible to prevent the window glass from being fogged.

PRIOR ART LITERATURES

Patent Literatures

Patent Literature 1: JP 2013-250035 A

SUMMARY OF INVENTION

However, in the refrigeration cycle device disclosed in Patent Literature 1, the check valve and the electric expansion valve become resistant to a refrigerant flow in the thermosiphon mode, resulting in a pressure loss. Therefore, the performance as a thermosiphon could not be fully exhibited, and the anti-fogging performance could be insufficient.

In view of the above difficulties, the present disclosure aims at obtaining a high anti-fogging performance.

In one aspect for achieving the above objects, a vehicle anti-fogging device, which is for use in a vehicle provided with an air conditioning apparatus for controlling a temperature of air blown into a vehicle interior, the vehicle anti-fogging device, includes a thermosiphon that is formed separately from the air conditioning apparatus. The thermosiphon is configured to exchange heat with vehicle interior air to condense the vehicle interior air. The thermosiphon includes a first heat exchanger configured to radiate heat from a refrigerant to vehicle exterior air, a second heat exchanger configured to absorb heat from the vehicle interior air into the refrigerant, and a refrigerant pipe that connects the first heat exchanger to the second heat exchanger to form a closed loop refrigerant circuit through which the refrigerant circulates.

According to the above configuration, the thermosiphon is configured separately from the air conditioning apparatus, and the refrigerant circuit of the thermosiphon has no check valve and no electric expansion valve which are resistant to the refrigerant flow, resulting in a reduction in the pressure loss. Therefore, the performance of the thermosiphon is sufficiently exhibited, and the high anti-fogging performance can be obtained.

DESCRIPTION OF EMBODIMENTS

Hereinafter, embodiments of the present disclosure will be described with reference to the drawings. In each of the following embodiments, parts that are the same as or equivalent to those described in the preceding embodiment are denoted by the same reference numerals, and a description of the same parts may be omitted. Also, in each of the embodiments, when only a part of the components is described, the components described in the preceding embodiments can be applied to the other parts of the components.

First Embodiment

Figure 1:
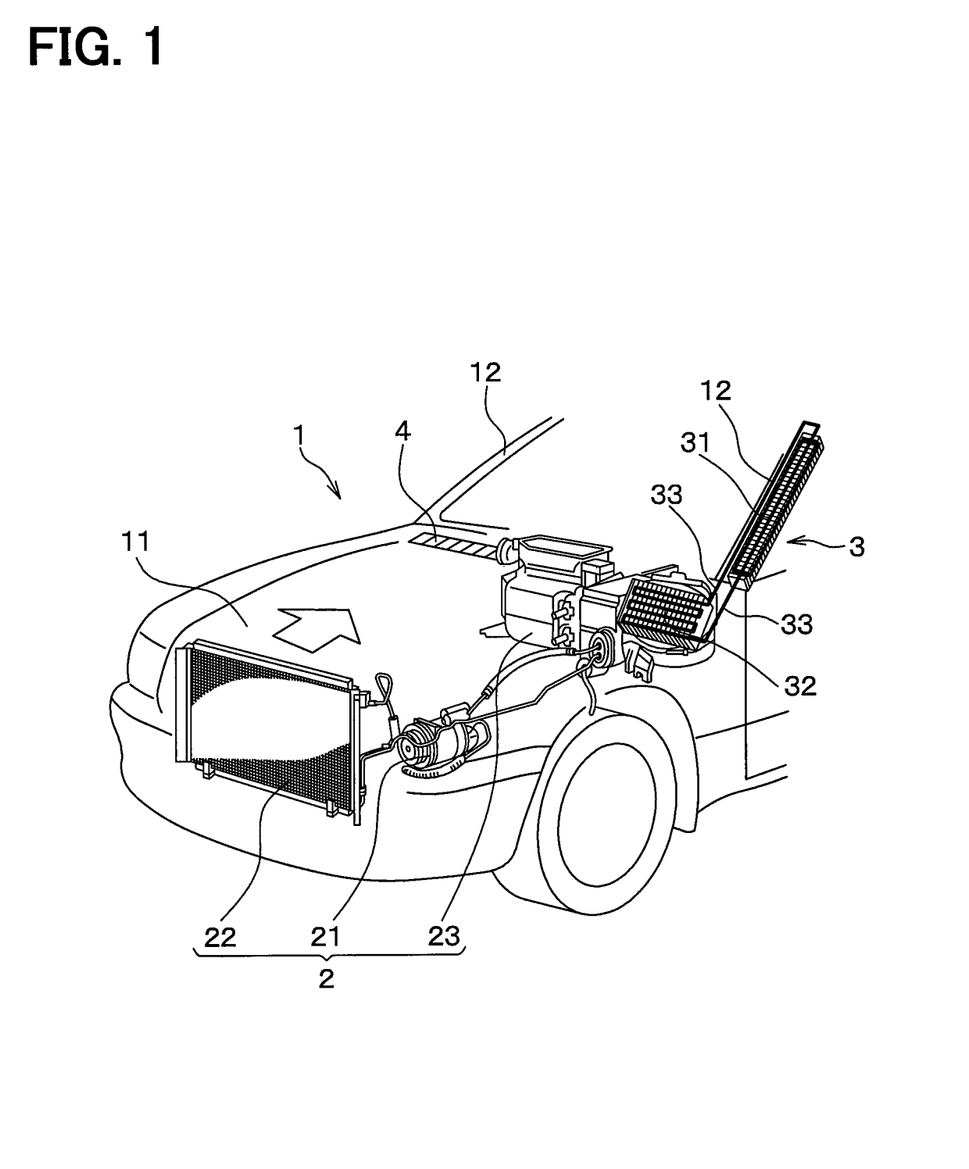
FIG. 1 is a perspective view illustrating a state in which an anti-fogging device is mounted on a vehicle according to a first embodiment.
Figure 2:
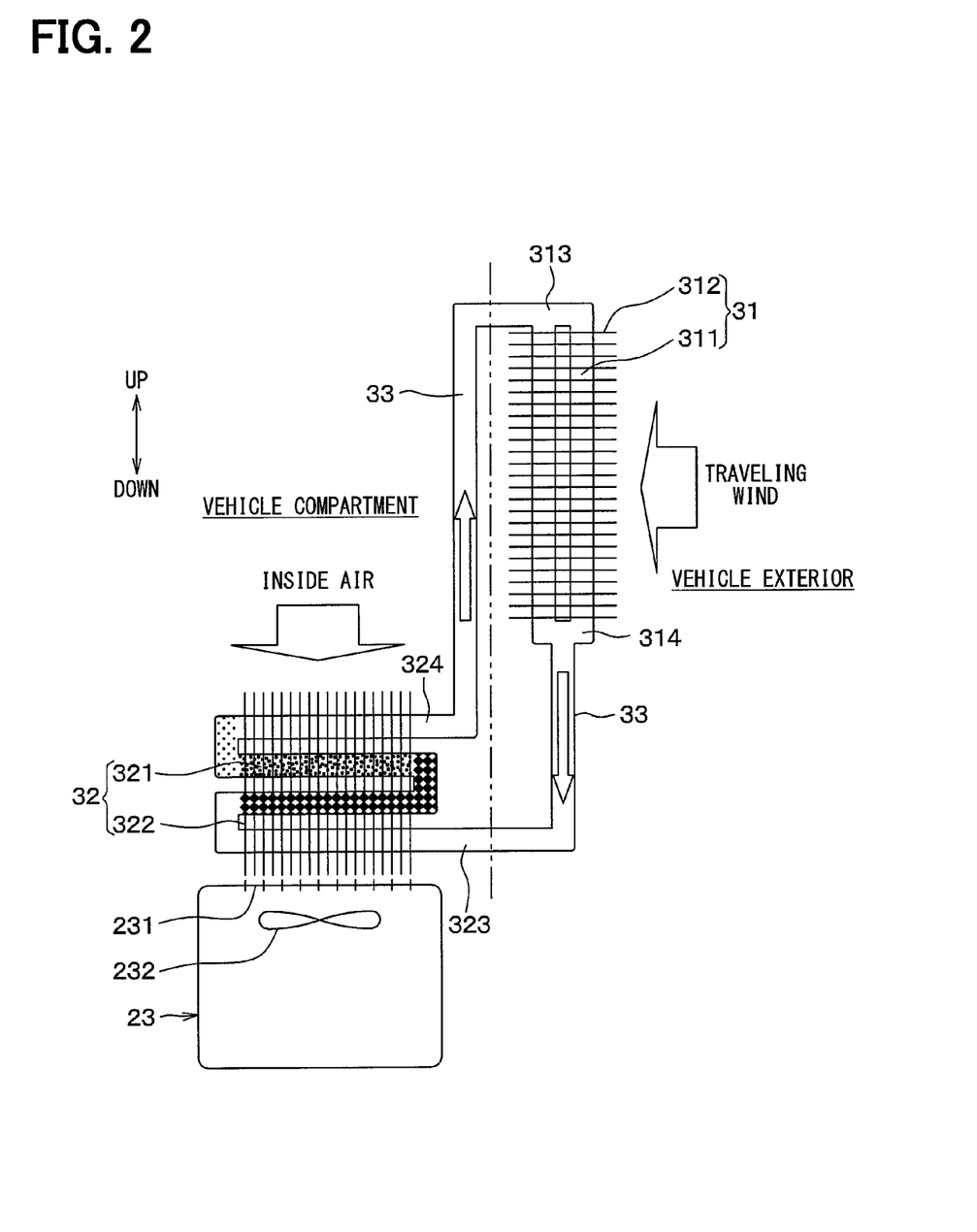
FIG. 2 is a diagram illustrating a vehicle anti-fogging device according to the first embodiment.

A first embodiment of the present disclosure will be described. As shown in FIGS. 1 and 2, a vehicle 1 is equipped with an air conditioning apparatus 2 using a vapor compression type refrigeration cycle and a vehicle anti-fogging device using a thermosiphon 3. The vehicle 1 includes a water cooled internal combustion engine not shown as a driving source for driving.

The air conditioning apparatus 2 includes a compressor 21 that is driven by an internal combustion engine to compress a refrigerant (for example, Freon gas R134a), and a condenser 22 that cools and condenses the refrigerant with an outside air (that is, vehicle exterior air). The compressor 21 and the condenser 22 are disposed in an engine compartment 11. The compressor 21, the condenser 22, and an evaporator to be described later form a vapor compression type refrigeration cycle.

The air conditioning apparatus 2 is provided with an air conditioning unit 23 that is disposed below an instrument panel in the vehicle interior. A case of the air conditioning unit 23 is equipped with an inside air suction port 231 that draws an inside air, an outside air suction port not shown which draws an outside air, and an inside/outside air switching door not shown which adjusts opening areas of the inside air suction port 231 and the outside air suction port to change a ratio of an introduction amount of the outside air and an introduction amount of the inside air. The inside/outside air switching door is driven by an actuator not shown.

An air conditioning blower 232 for generating an air flow in an air passage in the air conditioning unit 23 is disposed in the air conditioning unit 23. The air conditioning blower 232 is rotationally driven by an electric motor.

In an inside air mode in which the inside air suction port 231 is opened, the inside air is suctioned from the inside air suction port 231 by the air conditioning blower 232, and the suctioned inside air passes through the air passage inside the air conditioning unit 23, and is blown out from a blowing port not shown into the vehicle interior. In an outside air mode in which the outside air suction port is opened, the outside air is suctioned from the outside air suction port by the air conditioning blower 232, and the suctioned outside air passes through the air passage in the air conditioning unit 23, and is blown out from the blowing port into the vehicle interior.

An evaporator not shown which performs a heat exchange between an air flowing in the air conditioning unit 23 and a refrigerant to cool the air, and a heater core not shown which heats the air flowing in the air conditioning unit 23 with an engine coolant as a heat source, and so on are disposed in the air conditioning unit 23.

The thermosiphon 3 is configured separately from the air conditioning apparatus 2 and includes a first heat exchanger 31 for radiating a heat from the refrigerant (for example, Freon gas R134a) to the outside air, a second heat exchanger 32 for absorbing the heat from the inside air into the refrigerant, and a refrigerant pipe 33 that connects the first heat exchanger 31 and the second heat exchanger 32 to form a closed loop refrigerant circuit through which the refrigerant circulates.

The first heat exchanger 31 includes a first heat exchanger tube 311 through which the refrigerant flows and a first heat exchanger fin 312 for promoting a heat exchange between the outside air and the refrigerant. The first heat exchanger 31 is disposed in one of front pillars 12 of the vehicle 1.

The front pillars 12 are parts of a body of the vehicle 1. The front pillars 12 are support columns for supporting a ceiling portion of the body. The front pillars 12 are disposed at a left end and a right end of a windshield, which is a window glass on a front side of the vehicle, one by one. In FIG. 1, the first heat exchanger 31 is disposed in the front pillar 12 disposed at the left end of the windshield. Further, each front pillar is disposed between the windshield and a window glass on each side surface of the vehicle 1.

Further, a slit, not shown, for introducing a traveling wind (that is, outside air) into each front pillar 12 is provided in the front pillar 12 so that the traveling wind flowing from the slit passes through the first heat exchanger 31.

The second heat exchanger 32 includes a second heat exchanger tube 321 through which the refrigerant flows and a second heat exchanger fin 322 for promoting a heat exchange between the inside air and the refrigerant. The second heat exchanger 32 is disposed close to an air flow upstream side of the inside air suction port 231 in the vehicle interior. As a result, in the inside air mode, the air flow by the air conditioning blower 232 passes through the second heat exchanger 32 and flows into the air passage inside the air conditioning unit 23 from the inside air suction port 231.

In the first heat exchanger 31, a first heat exchanger inlet portion 313, which is a refrigerant inlet of the first heat exchanger 31, is located at a position higher than a first heat exchanger outlet portion 314 which is a refrigerant outlet of the first heat exchanger 31. In the second heat exchanger 32, a second heat exchanger inlet portion 323, which is a refrigerant inlet of the second heat exchanger 32, is located at a position lower than a second heat exchanger outlet portion 324 which is a refrigerant outlet of the second heat exchanger 32. The first heat exchanger outlet portion 314 is located at a position higher than the second heat exchanger inlet portion 323 and the second heat exchanger outlet portion 324.

Next, the operation of the present embodiment will be described. First, the operation of the air conditioning apparatus 2 will be described briefly. In the air conditioning apparatus 2, after the air flowing through the air passage in the air conditioning unit 23 has been cooled by the evaporator, the air is heated by a heater core as necessary, to thereby control a temperature of the air blown into the vehicle interior.

Next, the operation of the thermosiphon 3 when heating is carried out in winter season and the inside air mode is selected will be described.

In the thermosiphon 3, when the gas refrigerant flowing into the first heat exchanger 31 flows into the first heat exchanger 31, the gas refrigerant radiates a heat to the outside air and transitions to a liquid refrigerant. The liquid refrigerant flows out from the first heat exchanger outlet portion 314 due to gravity, reaches the second heat exchanger inlet portion 323 through the refrigerant pipe 33, and flows into the second heat exchanger 32.

In the inside air mode, since the air flow by the air conditioning blower 232 passes through the second heat exchanger 32, the liquid refrigerant flowing into the second heat exchanger 32 absorbs a heat from a warm inside air and gasifies. The refrigerant whose density is lowered by gasification flows out from the second heat exchanger outlet portion 324 due to a natural force of an upward airflow, reaches the first heat exchanger inlet portion 313 through the refrigerant pipe 33, and flows into the first heat exchanger 31. The gas refrigerant transitions to the liquid refrigerant again in the first heat exchanger 31.

In this manner, the refrigerant is liquefied in the first heat exchanger 31 and gasified in the second heat exchanger 32, and continuously circulates in a closed loop refrigerant circuit while always transitioning from one state to another. The refrigerant can transfer a large amount of heat due to a latent heat of the refrigerant at the time of the state transition.

In this case, since an air volume of the outside air passing through the first heat exchanger 31 is overwhelmingly larger than an air volume of the inside air passing through the second heat exchanger 32, the refrigerant temperature and a refrigerant pressure balanced by the thermosiphon 3 are dominated by the outside air temperature, and the refrigerant temperature becomes substantially the same as the outside air temperature. Therefore, a refrigerant evaporation temperature of the second heat exchanger 32 becomes as low as the outside air temperature, and reaches a temperature sufficiently lower than a dew point temperature of the inside air. As a result, the inside air passing through the second heat exchanger 32 is cooled to the dew point temperature or lower, dew condensation occurs, and dehumidification is performed. Therefore, fogging of the window glass can be prevented.

As the outside air temperature decreases more, a temperature difference between the inside air and the outside air increases more. For that reason, a greater dehumidification capacity is obtained with a reduction in the outside air temperature, and the anti-fogging performance is further improved. In addition, since the heat transfer is enabled even in an environment with extremely low outside air temperature, a low outside air temperature use limit is eliminated, leading to drastic anti-fogging improvement measures.

Next, the operation of the thermosiphon 3 when the vehicle is parked under a scorching sun in summer season will be described.

When the vehicle is parked under a scorching sun in summer, the inside air temperature reaches a high temperature close to 70° C. The refrigerant in the second heat exchanger 32 absorbs the heat from the high-temperature inside air, becomes low in density, and flows into the first heat exchanger 31 through the refrigerant pipe 33. The refrigerant flowing into the first heat exchanger 31 radiates the heat toward the outside air to increase the density, and flows into the second heat exchanger 32 through the refrigerant pipe 33. In other words, in the thermosiphon 3, the refrigerant automatically circulates in the refrigerant circuit without any power.

Since the refrigerant in the second heat exchanger 32 absorbs the heat from the high-temperature inside air, the inside air is cooled. In other words, when the vehicle is parked under the scorching sun in summer season, the thermosiphon 3 exerts a cooling function. This makes it possible to shorten a cool down time after starting the air conditioning apparatus 2, and makes it possible to save power consumption and fuel saving by backing up a cooling source.

According to the present embodiment described above, (a) the thermosiphon 3 is configured separately from the air conditioning apparatus 2, and the refrigerant circuit of the thermosiphon 3 has no check valve and no electric expansion valve which are resistant to the refrigerant flow, resulting in a reduction in the pressure loss. Therefore, the performance of the thermosiphon 3 is sufficiently exhibited, and the high anti-fogging performance can be obtained.

(b) Further, in cold seasons in winter season and spring and autumn middle seasons, the operation of the air conditioning apparatus 2 for the purpose of dehumidifying and anti-fogging is unnecessary. As a result, the power saving of the vehicle is performed and noise caused by vibration of the compressor 21 is eliminated, which leads to quietness in the vehicle.

(c) In addition, when the air conditioning apparatus 2 is operated under a low temperature and low heat load environment, there is a possibility that the refrigerant circulation amount in the refrigeration cycle may extremely decrease and oil return defects may occur. On the other hand, in cold seasons in winter season and spring and autumn middle seasons, since the operation of the air conditioning apparatus 2 for the purpose of dehumidifying and anti-fogging is unnecessary, the compressor 21 can be prevented from failing due to an oil return failure.

(d) In addition, the thermosiphon 3 sets a vertical positional relationship of each part in the two heat exchangers 31 and 32 to a predetermined relationship. As a result, when the outside air temperature is lower than the inside air temperature, the refrigerant automatically circulates in the refrigerant circuit without any power. When the outside air temperature is higher than the inside air temperature, the electric control is unnecessary since there is no refrigerant circulation and the function stops.

(e) Further, since the thermosiphon 3 is configured separately from the air conditioning apparatus 2 and can be configured as a self-contained product, the thermosiphon 3 can be retrofitted on the vehicle or mounted on an actual vehicle as an option.

Figure 3:
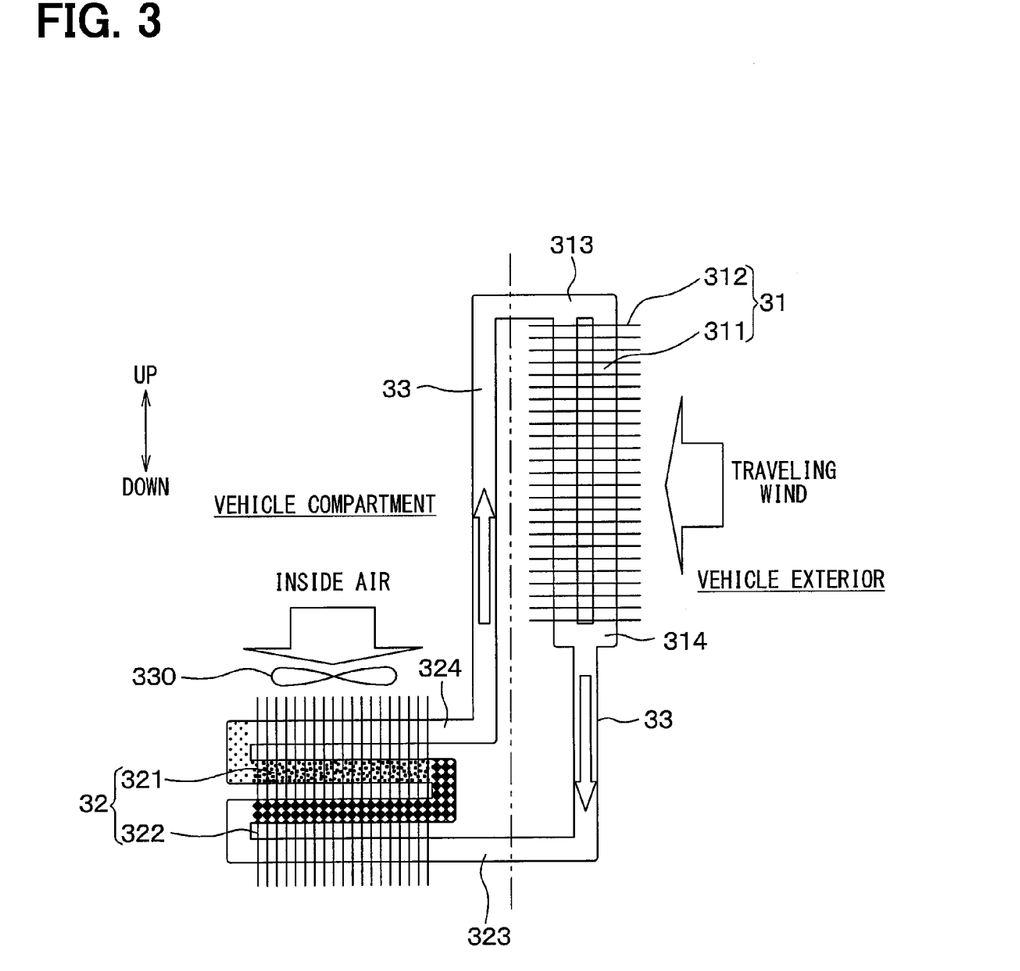
FIG. 3 is a diagram illustrating a vehicle anti-fogging device according to a first modification of the first embodiment.

In the embodiment described above, the second heat exchanger 32 is disposed close to the air flow upstream side of the inside air suction port 231, and in the inside air mode, the air flow by the air conditioning blower 232 passes through the second heat exchanger 32. However, as in the first modification shown in FIG. 3, an anti-fogging blower 330 for allowing the inside air to flow through the second heat exchanger 32 may be provided. According to the above configuration, since there is no need to dispose the second heat exchanger 32 close to the air flow upstream side of the inside air suction port 231, the second heat exchanger 32 can be disposed at any position in the vehicle interior.

Figure 4:
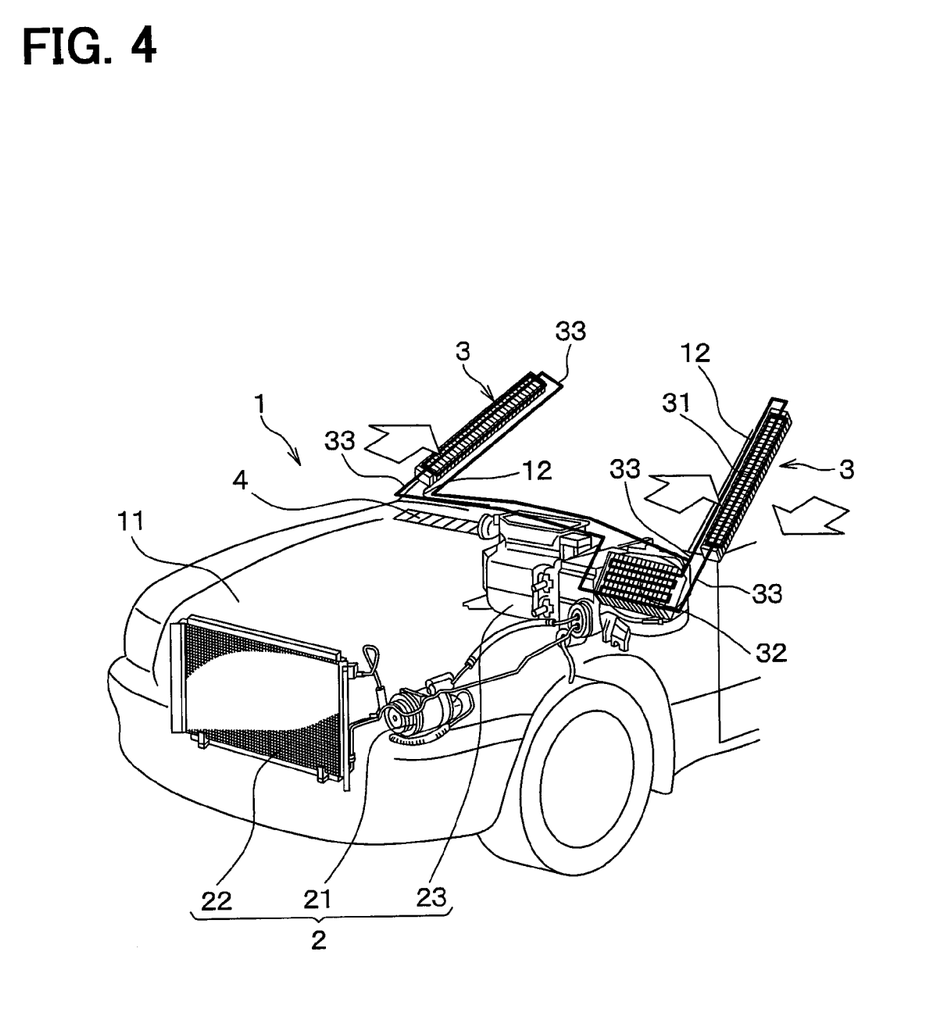
FIG. 4 is a perspective view illustrating a state in which a vehicle anti-fogging device is mounted on a vehicle according to a second modification of the first embodiment.
Figure 5:
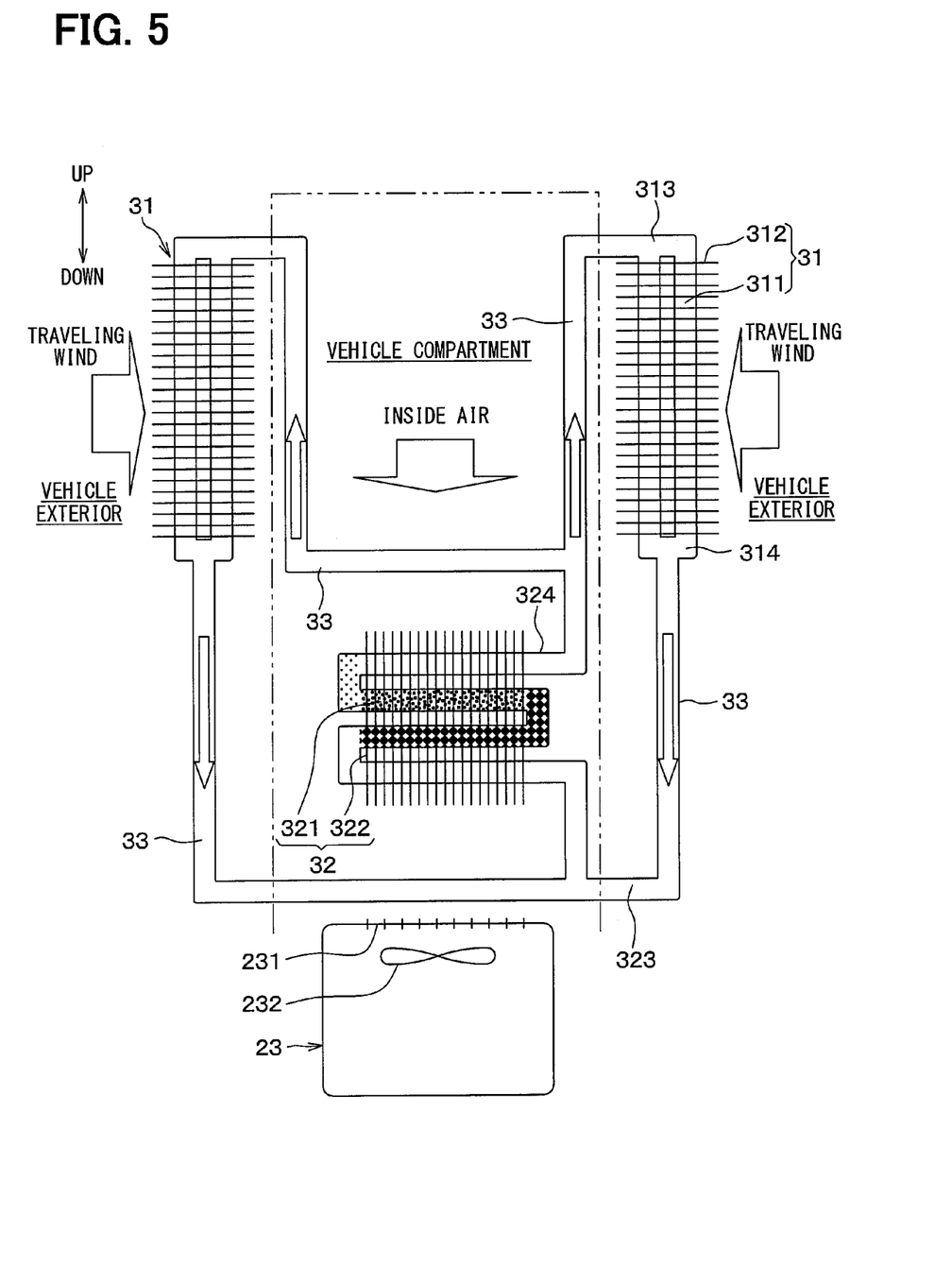
FIG. 5 is a diagram illustrating a vehicle anti-fogging device according to a second modification of the first embodiment.

In the embodiment described above, one first heat exchanger 31 is used. Alternatively, as in a second modification shown in FIGS. 4 and 5, the first heat exchanger 31 may be disposed in the respective left and right front pillars 12. In this case, those first heat exchangers 31 are connected in parallel to the second heat exchanger 32. According to the above configuration, the dehumidification capacity of the thermosiphon 3 is enhanced, and the anti-fogging performance is further improved.

In the embodiment described above, the first heat exchanger 31 is disposed in the front pillar 12. Alternatively, the first heat exchanger 31 may be disposed in a duct not shown provided in the cowl 4. The cowl 4 is an outer plate portion between an engine hood and the front windshield. According to the above configuration, the outside air flows in the duct provided in the cowl 4, and the refrigerant radiates the heat toward the outside air when flowing through the inside of the first heat exchanger 31.

Second Embodiment

A second embodiment will be described with reference to FIGS. 6 to 8. The present embodiment is different from the first embodiment in that the arrangement of the first heat exchanger 31 is changed and a pump for transferring the refrigerant of the thermosiphon 3 is provided. In the present embodiment, a description of the parts identical with or equivalent to those in the first embodiment will be omitted or simplified.

Figure 6:
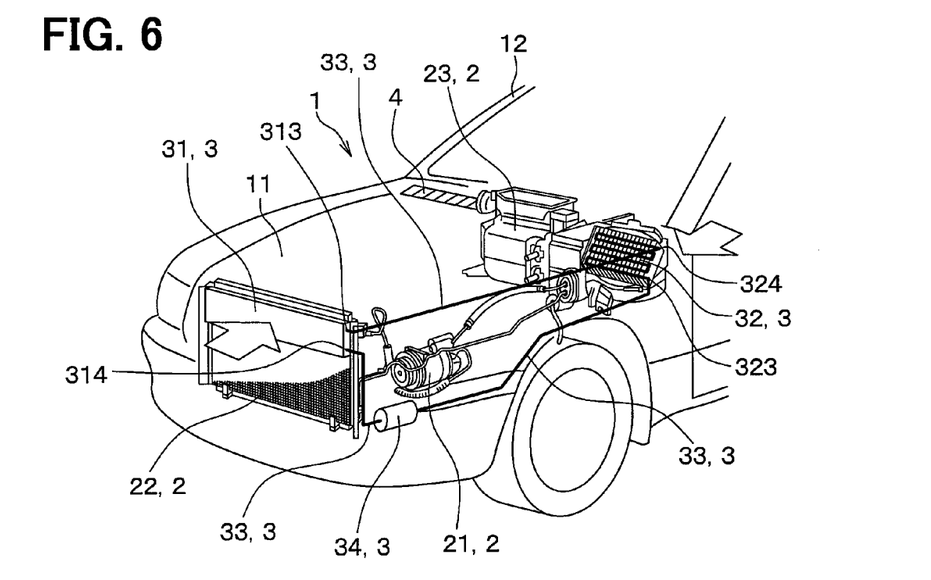
FIG. 6 is a perspective view illustrating a state in which a vehicle anti-fogging device is mounted on a vehicle according to a second embodiment.
Figure 7:
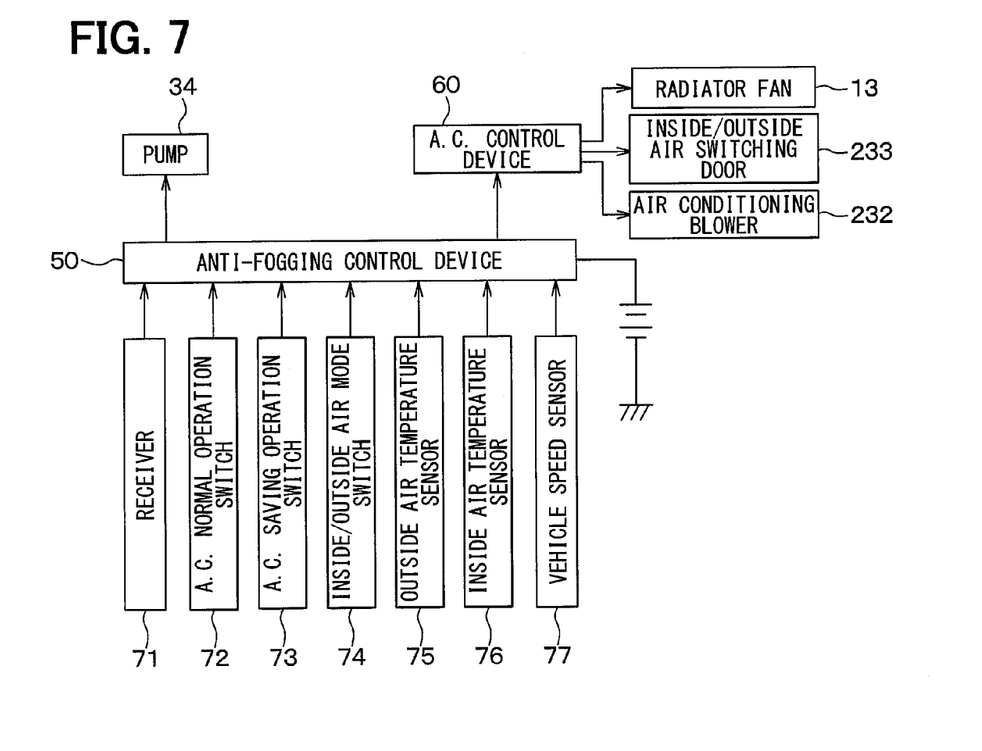
FIG. 7 is a block diagram illustrating a configuration of a control device for an anti-fogging device and a control device for an air conditioning apparatus according to the second embodiment.

As shown in FIG. 6, a first heat exchanger 31 of a thermosiphon 3 is disposed in an engine compartment 11. More specifically, the first heat exchanger 31 is disposed in front of a condenser 22 of an air conditioning apparatus 2. A radiator not shown for cooling an engine coolant and a radiator fan not shown rotationally driven by an electric motor are disposed at the rear of the condenser 22. With the operation of the radiator fan, an air flows into the first heat exchanger 31, the condenser 22, and the radiator.

In this case, a refrigerant pipe 33 that connects a first heat exchanger outlet portion 314 to a second heat exchanger inlet portion 323 is in an upward direction or vertical undulated configuration. The refrigerant pipe 33 is a refrigerant pipe that leads the refrigerant from the first heat exchanger 31 to the second heat exchanger 32. In this case, a natural flowing force leveraging the gravity of the refrigerant becomes poor, and a circulating refrigerant flow rate decreases in the entire thermosiphon 3, to thereby possibly reduce a heat transfer capability.

Under the circumstances, a refrigerant transfer pump 34 for transferring the refrigerant from the first heat exchanger 31 to the second heat exchanger 32 is provided in the refrigerant pipe 33 that connects the first heat exchanger outlet portion 314 and the second heat exchanger inlet portion 323. The refrigerant transfer pump 34 is driven by an electric motor.

An installation position of the refrigerant transfer pump 34 is preferably a position where a liquid refrigerant stably exists on an intake side of the refrigerant transfer pump 34, for example, immediately after the first heat exchanger outlet portion 314.

Since a refrigerant circulation amount required to prevent fogging of the window glass at a low outside air temperature is small and the pressure difference of the refrigerant circulating through the first heat exchanger 31 and the second heat exchanger 32 is also small, the refrigerant transfer pump 34 can be configured with an electric pump small in size and small in electric power.

Next, an anti-fogging control device 50 which is an electric control unit of the thermosiphon 3 and an air-conditioning control device 60 which is an electric control unit of the air conditioning apparatus 2 will be described with reference to FIG. 7. The anti-fogging control device 50 and the air-conditioning control device 60 shown in FIG. 7 are each configured by a microcomputer including a CPU and a storage unit such as a ROM and a RAM, and peripheral circuits of the microcomputer. The anti-fogging control device 50 and the air-conditioning control device 60 perform various calculations and processes based on a control program stored in the storage unit, and control the operation of various devices connected to an output side of those devices.

An input side of the anti-fogging control device 50 is connected with a receiver 71, an air conditioning normal operation switch 72, an air conditioning saving operation switch 73, an inside/outside air mode switch 74, an outside air temperature sensor 75, an inside air temperature sensor 76, and a vehicle speed sensor 77.

Specifically, the receiver 71 receives radio waves from a remote controller. In addition, a reservation operation for starting operation of the thermosiphon 3 at a predetermined time can be set by the remote controller. The reservation operation is an operation mode assuming to operate before entering a vehicle parked under the scorching sun in summer, which is an operation mode in which the inside air temperature is lowered by the thermosiphon 3 in a state where the compressor 21 is stopped.

The air conditioning normal operation switch 72 is a switch for switching on and off the operation of the air conditioning apparatus 2. The air conditioning saving operation switch 73 is a switch for setting an energy saving operation mode of the air conditioning apparatus 2. The inside/outside air mode switch 74 is a switch for selecting the inside air mode or the outside air mode. The outside air temperature sensor 75 is a sensor for detecting an outside air temperature TO. The inside air temperature sensor 76 is a sensor for detecting an inside air temperature TR. The vehicle speed sensor 77 is a sensor for detecting a speed VC of the vehicle.

When the air conditioning saving operation switch 73 is turned on to select the energy saving operation mode, as compared with the case where the air conditioning saving operation switch 73 is turned off to select the normal operation mode, the temperature of the air immediately after having passed through the evaporator is controlled to be high. As a result, a load of the compressor 21 is reduced and energy saving is achieved. At the same time, in the energy saving operation mode, since the temperature of the air immediately after having passed through the evaporator is controlled to be high, the dehumidification capacity is reduced as compared with that in the normal operation mode.

The refrigerant transfer pump 34 is connected to an output side of the anti-fogging control device 50. An air conditioning blower 232, an inside/outside air switching door 233, and a radiator fan 13 are connected to the output side of the air-conditioning control device 60.

Next, the operation of the thermosiphon 3 and the air conditioning apparatus 2 will be described. First, the air conditioning apparatus 2 starts operation when the operation start time set by the remote controller comes, or when the air conditioning normal operation switch 72 is turned on. As described above, the temperature and air volume of the air blown into the vehicle interior are controlled.

Next, the operation of the thermosiphon 3 will be described with reference to a flowchart shown in FIG. 8. The anti-fogging control device 50 executes a control process shown in a flowchart of FIG. 8 when the operation start time set by the remote controller comes, or when the air conditioning normal operation switch 72 is turned on.

Figure 8:
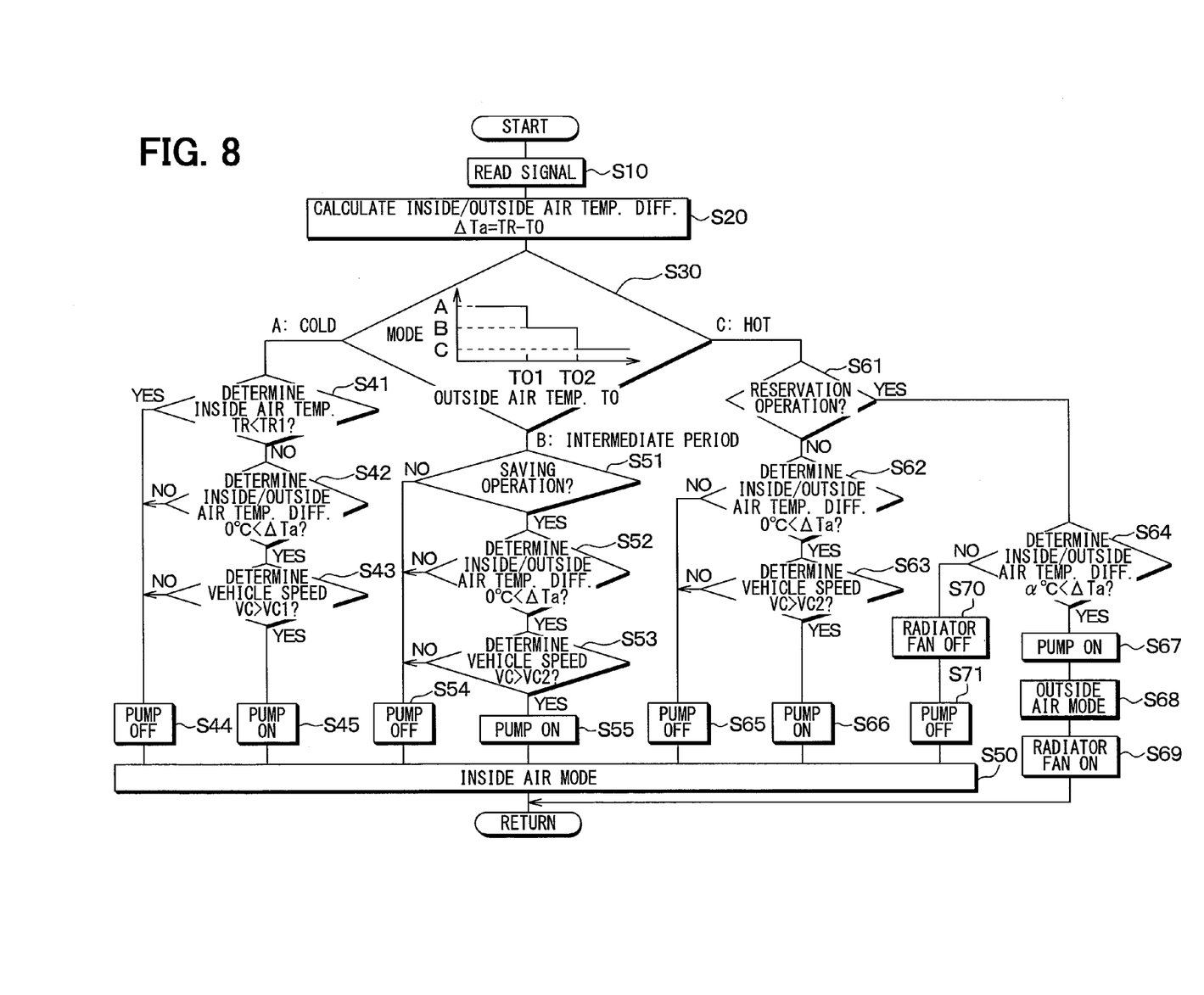
FIG. 8 is a flowchart illustrating a flow of a control process of the anti-fogging device to be executed by the control device according to the second embodiment.

As shown in FIG. 8, the anti-fogging control device 50 acquires signals from the receiver 71, the switches 72, 73, 74 and the sensors 75, 76, 77 (S10). Subsequently, the anti-fogging control device 50 acquires an inside and outside air temperature difference $\Delta Ta$ based on an inside air temperature TR and an outside air temperature TO acquired in S10 (S20). An expression $\Delta Ta=TR-TO$ is satisfied.

Subsequently, a vehicle exterior environment mode is discriminated on the basis of the outside air temperature TO acquired in S10 (S30). Specifically, when the outside air temperature TO is lower than a first set outside air temperature TO1 (for example, 8° C.), the operation mode is determined as a cold mode A, and when the outside air temperature TO exceeds a second set outside air temperature TO2 (for example, 25° C.), the operation mode is determined as a hot heat mode C. When the outside air temperature TO is equal to or higher than the first set outside air temperature and lower than the second set outside air temperature, the operation mode is determined as an intermediate mode B. The first set outside air temperature TO1 and the second set outside air temperature TO2 are stored in advance in the ROM of the anti-fogging control device 50.

When the operation mode is determined as the cold mode A as a result of the determination processing in step S30, it is determined whether the refrigerant transfer pump 34 is turned on, or not, based on the determination in Steps S41 to S43 as will be described in detail below.

First, when the inside air temperature TR acquired in S10 is lower than a lower limit inside air temperature TR1 (for example, 10° C.) (yes in S41), that is, when the air temperature TR is too low, the refrigerant transfer pump 34 is turned off to stop the thermosiphon 3 (S44) in order to prioritize heating. The lower limit inside air temperature TR1 is stored in advance in the ROM of the anti-fogging control device 50.

When the inside air temperature TR is lower than the lower limit inside air temperature TR1 (for example, 10° C.), the anti-fogging control device 50 outputs a control signal to the air-conditioning control device 60, and the air-conditioning control device 60 displaces the inside/outside air switching door 233 to an inside air mode position based on the control signal (S50).

Further, when the inside and outside air temperature difference $\Delta Ta$ calculated in S20 is 0° C. or lower (no in S42), that is, when the inside air temperature TR is lower than the outside air temperature TO, the refrigerant transfer pump 34 is turned off to stop the thermosiphon 3 in order to prioritize the heating (S44), and displaces the inside/outside air switching door 233 to the inside air mode position (S50).

In this example, as described above, in the vapor compression type refrigeration cycle, when the outside air temperature is low and the vehicle travels at a high speed, the refrigerant cooling capacity of the condenser 22 becomes too high, and the refrigerant circulation amount in the refrigeration cycle is extremely reduced. As a result, an absolute humidity of the air conditioning wind used for anti-fogging increases, and the window glass is likely to be foggy. Conversely, the window glass is difficult to fog at the time of traveling at a low speed.

Therefore, when the vehicle speed VC acquired in S10 is lower than a first lower limit vehicle speed VC1 (for example, 40 km/h) (no in S43), that is, when the vehicle speed is low, the refrigerant transfer pump 34 is turned off to stop the thermosiphon 3 (S44), and the inside/outside air switching door 233 is displaced to the inside air mode position (S50). The first lower limit vehicle speed VC1 is stored in advance in the ROM of the anti-fogging control device 50.

On the other hand, if the inside air temperature TR is equal to or higher than the lower limit inside air temperature TR1 (no in S41), the inside and outside air temperature difference $\Delta Ta$ exceeds 0° C. (yes in S42) and the vehicle speed VC exceeds the first lower limit vehicle speed VC1 (yes in S43), the refrigerant transfer pump 34 is turned on (S45) to transfer the refrigerant from the first heat exchanger 31 to the second heat exchanger 32. As a result, the inside air passing through the second heat exchanger 32 is cooled to the dew point temperature or lower, dew condensation occurs, and dehumidification is performed. Therefore, fogging of the window glass can be prevented.

When the operation mode is determined as the intermediate mode B as a result of the determination processing in step S30, it is determined whether the refrigerant transfer pump 34 is turned on, or not, based on the determination in Steps S51 to S53 as will be described in detail below.

First, when the air conditioning saving operation switch 73 is turned off and the normal operation mode is set (no in S51), since the dehumidification capacity is high and fogging of the window glass is unlikely to occur, the refrigerant transfer pump 34 is turned off to stop the thermosiphon 3 (S54), and the inside/outside air switching door 233 is displaced to the inside air mode position (S50).

Further, when the inside and outside air temperature difference $\Delta Ta$ calculated in S20 is 0° C. or lower (no in S52), that is, when the inside air temperature TR is lower than the outside air temperature TO, the refrigerant transfer pump 34 is turned off to stop the thermosiphon 3 in order to prioritize the heating (S54), and displaces the inside/outside air switching door 233 to the inside air mode position (S50).

In addition, when the vehicle speed VC acquired in S10 is lower than a second lower limit vehicle speed VC2 (for example, 70 km/h) (no in S53), the refrigerant transfer pump 34 is turned off to stop the thermosiphon 3 (S54), and the inside/outside air switching door 233 is displaced to the inside air mode position (S50). The second lower limit vehicle speed VC2 is stored in advance in the ROM of the anti-fogging control device 50.

In the intermediate mode B, since the outside air temperature is higher than that in the cold mode A, a phenomenon that the refrigerant cooling capacity of the condenser 22 described above becomes too high and the refrigerant circulation amount of the refrigeration cycle extremely decreases occurs in a higher speed zone than in the case of the cold mode A. Therefore, the second lower limit vehicle speed VC2 in the intermediate mode B is set to be higher than the first lower limit vehicle speed VC1 in the cold mode A.

On the other hand, when the air conditioning saving operation switch 73 is turned on and the energy saving operation mode is set (yes in S51), the dehumidification capacity is lowered as compared with that in the normal operation mode as described above. For that reason, the anti-fogging capacity needs to be enhanced.

Therefore, when the air conditioning saving operation switch 73 is turned on (yes in S51), the inside and outside air temperature difference ΔTa exceeds 0° C. (yes in S52) and the vehicle speed VC exceeds the second lower limit vehicle speed VC2 (yes in S53), the refrigerant transfer pump 34 is turned on (S55) to transfer the refrigerant from the first heat exchanger 31 to the second heat exchanger 32. As a result, the inside air passing through the second heat exchanger 32 is cooled to the dew point temperature or lower, dew condensation occurs, and dehumidification is performed. Therefore, fogging of the window glass can be prevented.

As a result of the determination process in Step S30, when the operation mode is determined as the hot heat mode C, it is first determined whether the operation mode is a reservation operation mode, or not (S61).

When the normal operation mode or the energy saving operation mode is being executed (no in S61), it is determined whether to turn on the refrigerant transfer pump 34, or not, by the determination in Steps S62 to S63, as will be described in detail below.

First, it is assumed that the normal mode operation or the energy saving operation mode is being performed (no in S61) and the inside and outside air temperature difference ΔTa calculated in S20 is 0° C. or lower (no in S62), in other words, the inside air temperature TR is lower than the outside air temperature TO. In such a case, in order to prevent the refrigerant in the first heat exchanger 31 from absorbing the heat from the high temperature outside air to transfer the heat to the second heat exchanger 32 and conversely heat the vehicle interior air, the refrigerant transfer pump 34 is turned off to stop the thermosiphon 3 (S65), and the inside/outside air switching door 233 is displaced to the inside air mode position (S50).

In addition, when the vehicle speed VC acquired in S10 is lower than a second lower limit vehicle speed VC2 (no in S63), the refrigerant transfer pump 34 is turned off to stop the thermosiphon 3 (S65), and the inside/outside air switching door 233 is displaced to the inside air mode position (S50).

On the other hand, if the normal mode operation or the energy saving operation mode is carried out (no in S61), the inside and outside air temperature difference ΔTa exceeds 0° C. (yes in S62) and the vehicle speed VC exceeds the second lower limit vehicle speed VC2 (yes in S63), the refrigerant transfer pump 34 is turned on (S66) to transfer the refrigerant from the first heat exchanger 31 to the second heat exchanger 32. As a result, the inside air passing through the second heat exchanger 32 is cooled to the dew point temperature or lower, dew condensation occurs, and dehumidification is performed. Therefore, fogging of the window glass can be prevented.

Returning to Step S61, when the reservation operation mode is being executed based on the setting of the remote controller (yes in S61), it is determined whether to turn on the refrigerant transfer pump 34, or not, by the determination in Step S64, as will be described in detail below.

As described above, the reservation operation mode is an operation mode assuming to operate before entering a vehicle parked under the scorching sun in summer, and the compressor 21 is stopped.

When the inside and outside air temperature difference ΔTa calculated in S20 exceeds a temperature difference set value α° C. (for example, 10° C.) (yes in S64), that is, the temperature in the vehicle interior is rising such that the inside air temperature exceeds the outside air temperature by more than the temperature difference set value α° C., the refrigerant transfer pump 34 is turned on (S67) to transfer the refrigerant from the first heat exchanger 31 to the second heat exchanger 32. The temperature difference set value α° C. is stored in advance in the ROM of the anti-fogging control device 50.

In addition, when the inside and outside air temperature difference ΔTa exceeds the temperature difference set value α° C., the anti-fogging control device 50 outputs a control signal to the air-conditioning control device 60, and the air-conditioning control device 60 displaces the inside/outside air switching door 233 to the outside air mode position based on the control signal (S68), and operates the air conditioning blower 232 and the radiator fan 13 (S69).

According to the above configuration, since the operation mode is set to the outside air mode, the outside air having a temperature lower than that of the inside air is introduced into the vehicle interior. In addition, with the operation of the radiator fan 13, the refrigerant in the first heat exchanger 31 radiates the heat, and with the operation of the refrigerant transfer pump 34, the refrigerant that has radiated the heat in the first heat exchanger 31 is transferred to the second heat exchanger 32.

As a result, the outside air having a temperature lower than that of the inside air is introduced into the vehicle interior, and when the outside air passes through the second heat exchanger 32, the heat is absorbed by the refrigerant and the temperature of the outside air further drops. The vehicle interior is cooled by the outside air whose heat has been absorbed by the refrigerant and whose temperature has further decreased, and the inside air temperature is lowered.

Returning to Step S64, when the inside and outside air temperature difference ΔTa is initially equal to or less than the temperature difference set value α° C. (no in S64), or when the inside air temperature drops due to execution of Steps S67 to S69, the inside and outside air temperature difference ΔTa is equal to or less than the temperature difference set value α° C. (no in S64), the air conditioning blower 232 and the radiator fan 13 are stopped (S70), the refrigerant transfer pump 34 is stopped (S71), the thermosiphon 3 is stopped, and the inside/outside air switching door 233 is displaced to the inside air mode position (S50).

According to the present embodiment, the advantages (a) to (c) among the advantages (a) to (e) of the first embodiment can be obtained.

Further, since the refrigerant transfer pump 34 is provided, the refrigerant can be surely transferred from the first heat exchanger 31 to the second heat exchanger 32 regardless of a positional relationship between the first heat exchanger outlet portion 314 and the second heat exchanger inlet portion 323, and so on.

Third Embodiment

A third embodiment will be described with reference to FIGS. 9 and 10. The present embodiment is different from the first embodiment in that an installation position of the thermosiphon 3 and the configuration of the first heat exchanger 31 are changed. In the present embodiment, a description of the parts identical with or equivalent to those in the first embodiment will be omitted or simplified.

Figure 9:
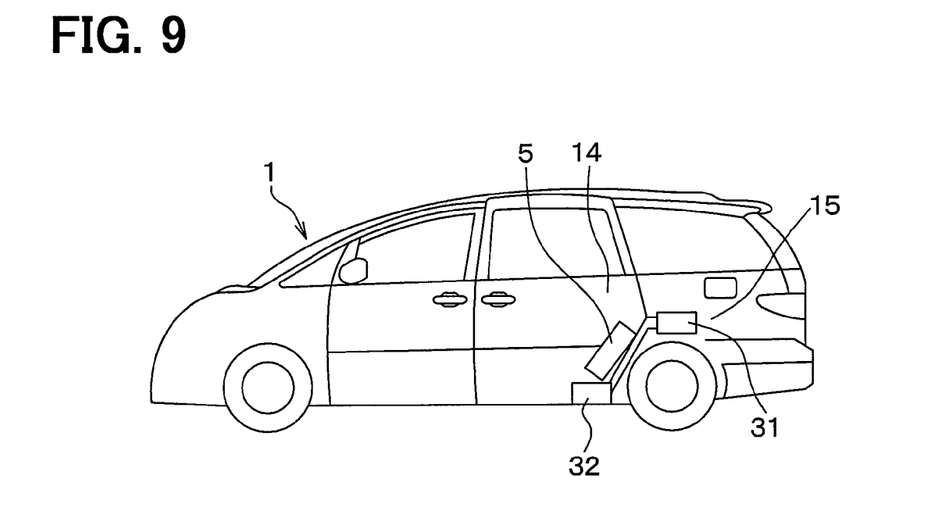
FIG. 9 is a perspective view illustrating a state in which an anti-fogging device is mounted on a vehicle according to a third embodiment.
Figure 10:
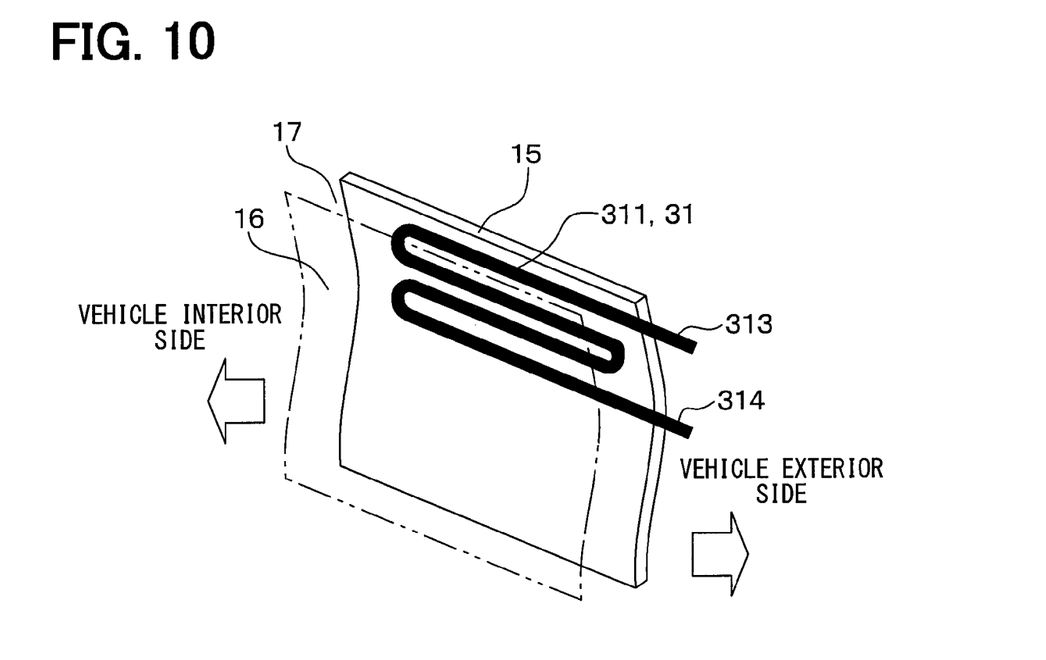
FIG. 10 is a perspective view illustrating a main part of the anti-fogging device according to the third embodiment.

As shown in FIG. 9, a vehicle 1 is provided with a rear seat cooler 5. A second heat exchanger 32 is disposed close to an air flow upstream side of an inside air suction port not shown of the rear seat cooler 5 in a vehicle interior.

A first heat exchanger 31 is disposed in a gap 17 between a vehicle outer plate 15 and a vehicle inner plate 16 located behind a rear seat door 14 of the vehicle 1.

Also, paying attention to the fact that the vehicle outer plate 15 comes in direct contact with an outside air, is made of metal excellent in thermal conductivity and large in area, in the present embodiment, the vehicle outer plate 15 is leveraged as an air side heat radiation plate of the first heat exchanger 31, and the first heat exchanger fin 312 is eliminated. Specifically, in the first heat exchanger 31, the first heat exchanger tube 311 is brought into close contact with the vehicle outer plate 15, and is joined to the vehicle outer plate 15 by brazing to obtain a high thermal conductivity. As a result, the gas refrigerant flowing into the first heat exchanger tube 311 radiates to the outside air through the vehicle outer plate 15. The first heat exchanger tube 311 corresponds to a refrigerant tube.

In addition, the first heat exchanger tube 311 is disposed above an upper end of at least the second heat exchanger 32. As a result, the refrigerant liquefied in the first heat exchanger tube 311 flows into the second heat exchanger 32 by gravity.

With the above configuration, the thermosiphon 3 has the same refrigerant flow behavior and refrigerant state transition as those in the first embodiment. The inside air passing through the second heat exchanger 32 is cooled down to a dew point temperature or lower, dew condensation occurs, dehumidification is performed, and the inside air is blown out from a blowing port of the rear seat cooler 5.

According to the present embodiment, the same advantages as those in the first embodiment can be obtained. In addition, since the inside air dehumidified by the thermosiphon 3 is blown out from the blowing port of the rear seat cooler 5, the humidity of the entire vehicle interior is lowered, and the anti-fogging performance is improved.

In the present embodiment, the vehicle outer plate 15 is leveraged as the air side heat radiation plate of the first heat exchanger 31. Alternatively, the vehicle inner plate 16 may be leveraged as the air side heat radiation plate of the second heat exchanger 32. In this case, the second heat exchanger tube 321 is brought into tight contact with the vehicle inner plate 16 and joined to the vehicle inner plate 16 by brazing.

Other Embodiments

It should be noted that the present disclosure is not limited to the embodiments described above, and can be appropriately modified.

In addition, each of the above-described embodiments is related to each other, and can be appropriately combined with each other except for a case where the combination is apparently impossible.

In the above-described respective embodiments, elements configuring the embodiments are not necessarily indispensable as a matter of course, except when the elements are particularly specified as indispensable and the elements are considered as obviously indispensable in principle.

In the above-described respective embodiments, when numerical values such as the number, figures, quantity, a range of configuration elements in the embodiments are described, the numerical values are not limited to a specific number, except when the elements are particularly specified as indispensable and the numerical values are obviously limited to the specific number in principle.

In the above-described respective embodiments, when a shape, a positional relationship, and the like of a configuration element and the like are mentioned, the shape, the positional relationship, and the like are not limited thereto excluding a particularly stated case and a case of being limited to specific shape, positional relationship, and the like based on the principle.

What is claimed is:

1. A vehicle anti-fogging device for use in a vehicle provided with an air conditioning apparatus for controlling a temperature of air blown into a vehicle interior, the vehicle anti-fogging device comprising:
   a thermosiphon that is formed separately from the air conditioning apparatus, the thermosiphon being configured to exchange heat with vehicle interior air to condense the vehicle interior air, wherein
   the thermosiphon includes
      a first heat exchanger configured to radiate heat from a refrigerant to vehicle exterior air,
      a second heat exchanger configured to absorb heat from the vehicle interior air into the refrigerant, and
      a refrigerant pipe that connects the first heat exchanger to the second heat exchanger to form a closed loop refrigerant circuit through which the refrigerant circulates.

2. The vehicle anti-fogging device according to claim 1, wherein
   the first heat exchanger is disposed in a front pillar of the vehicle.

3. The vehicle anti-fogging device according to claim 1, wherein
   the first heat exchanger is disposed in each of left and right front pillars of the vehicle.

4. The vehicle anti-fogging device according to claim 1, wherein
   the first heat exchanger is disposed in a duct provided in a cowl of the vehicle.

5. The vehicle anti-fogging device according to claim 1, wherein
   a first heat exchanger inlet portion which is a refrigerant inlet of the first heat exchanger is located at a position higher than a first heat exchanger outlet portion which is a refrigerant outlet of the first heat exchanger, a second heat exchanger inlet portion which is a refrigerant inlet of the second heat exchanger, and a second heat exchanger outlet portion which is a refrigerant outlet of the second heat exchanger,
   the first heat exchanger outlet portion is located at a position higher than the second heat exchanger inlet portion and the second heat exchanger outlet portion, and
   the second heat exchanger inlet portion is located at a position lower than the second heat exchanger outlet portion.

6. The vehicle anti-fogging device according to claim 1, wherein
   the thermosiphon includes a refrigerant transfer pump that transfers the refrigerant, after having heat radiated by the first heat exchanger, from the first heat exchanger to the second heat exchanger.

7. The vehicle anti-fogging device according to claim 1, wherein
   the air conditioning apparatus includes an air conditioning blower that sucks the vehicle interior air from a suction port and then generates an air flow by circulating the vehicle interior air in the air conditioning apparatus and blowing the vehicle interior air into the vehicle interior, and the second heat exchanger is disposed upstream of the suction port in an air flow direction, and the air flow generated by the air conditioning blower passes through the second heat exchanger.

8. The vehicle anti-fogging device according to claim 1, wherein the thermosiphon includes an anti-fogging blower that causes the vehicle interior air to flow in the second heat exchanger.

9. The vehicle anti-fogging device according to claim 1, wherein the first heat exchanger includes a refrigerant tube through which the refrigerant flows, and the refrigerant tube is in close contact with an outer plate of the vehicle.

\* \* \* \* \*